United States Patent
Adamski et al.

(10) Patent No.: US 11,247,521 B2
(45) Date of Patent: Feb. 15, 2022

(54) BUMPER ARRANGEMENT WITH A CLINCHED RECEPTACLE

(71) Applicant: BENTELER AUTOMOBILTECHNIK GMBH, Paderborn (DE)

(72) Inventors: Lucas Adamski, Paderborn (DE); Konstantin Tatarinov, Bielefeld (DE); Gero Muellers, Paderborn (DE); Joern Toelle, Paderborn (DE); Christian Handing, Langenberg (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 109 days.

(21) Appl. No.: 16/839,097

(22) Filed: Apr. 3, 2020

(65) Prior Publication Data
US 2020/0317012 A1    Oct. 8, 2020

(30) Foreign Application Priority Data
Apr. 4, 2019  (DE) ............. 10 2019 108 907.7

(51) Int. Cl.
| | |
|---|---|
| *B60J 7/00* | (2006.01) |
| *B60D 1/56* | (2006.01) |
| *B60R 19/48* | (2006.01) |
| *B60R 19/34* | (2006.01) |

(52) U.S. Cl.
CPC .............. *B60D 1/565* (2013.01); *B60R 19/34* (2013.01); *B60R 19/48* (2013.01)

(58) Field of Classification Search
CPC ......... B60R 19/34; B60R 19/18; B60R 21/34; B60R 19/023; B60R 2019/186; B60R 2019/247; B62D 21/152
See application file for complete search history.

(56) References Cited

U.S. PATENT DOCUMENTS

| | | | |
|---|---|---|---|
| 2004/0041416 A1* | 3/2004 | Harrison ............... | B60D 1/488 293/117 |
| 2006/0157993 A1* | 7/2006 | Pendarvis .............. | B60R 19/24 293/132 |
| 2006/0255603 A1* | 11/2006 | Rebuffet ............. | B62D 25/209 293/120 |
| 2006/0290150 A1* | 12/2006 | Roll ........................ | B60R 19/18 293/133 |

(Continued)

FOREIGN PATENT DOCUMENTS

| | | |
|---|---|---|
| DE | 10359483 A1 | 7/2005 |
| DE | 102007024882 A1 | 12/2008 |

OTHER PUBLICATIONS

Office Action for German Application No. 10 2019 108 907.7 dated Jan. 24, 2020; 12pp.

*Primary Examiner* — Kiran B Patel
(74) *Attorney, Agent, or Firm* — Hauptman Ham, LLP

(57) ABSTRACT

The disclosure relates to a bumper arrangement on a motor vehicle, having a crossmember and crash boxes, by means of which the crossmember is coupled to a motor vehicle, wherein a receptacle for a towing eye is formed in the bumper arrangement and the receptacle is produced in the form of an extruded profile component, wherein the receptacle is inserted into the crossmember and/or into a crash box and is fixed by clinching.

18 Claims, 12 Drawing Sheets

(56) References Cited

U.S. PATENT DOCUMENTS

| | | | | |
|---|---|---|---|---|
| 2007/0182176 A1* | 8/2007 | Muskos | ............... | B60R 19/34 |
| | | | | 293/133 |
| 2009/0045638 A1* | 2/2009 | Handing | ............... | B60R 19/18 |
| | | | | 293/155 |
| 2009/0206617 A1* | 8/2009 | Ahlin | ............... | B60D 1/56 |
| | | | | 293/117 |
| 2010/0133859 A1* | 6/2010 | Lutke-Bexten | ......... | B60R 19/18 |
| | | | | 293/102 |
| 2016/0362144 A1* | 12/2016 | Potthast | ............... | B23K 31/02 |
| 2017/0057440 A1* | 3/2017 | Kitakata | ............... | B60R 19/30 |
| 2017/0088075 A1* | 3/2017 | Hashimoto | ............... | F16F 7/00 |
| 2017/0113638 A1* | 4/2017 | Ahuja | ............... | B60R 19/34 |
| 2018/0141512 A1* | 5/2018 | Munjurulimana | ...... | B60R 19/18 |
| 2018/0171449 A1* | 6/2018 | Skubich | ............... | C22F 1/053 |
| 2018/0370470 A1* | 12/2018 | Hultkvist | ............... | B60R 19/34 |
| 2019/0168700 A1* | 6/2019 | Lattorff | ............... | B60R 19/04 |
| 2019/0344737 A1* | 11/2019 | Hultkvist | ............... | B60R 19/34 |
| 2020/0122663 A1* | 4/2020 | Nilsson | ............... | B60R 19/18 |
| 2020/0254948 A1* | 8/2020 | Toller | ............... | B60R 19/483 |

* cited by examiner

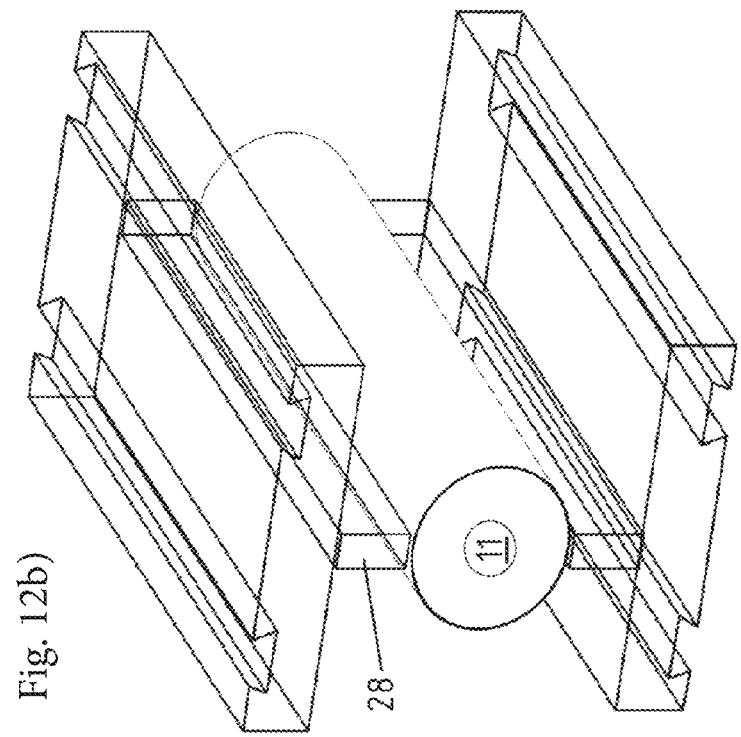
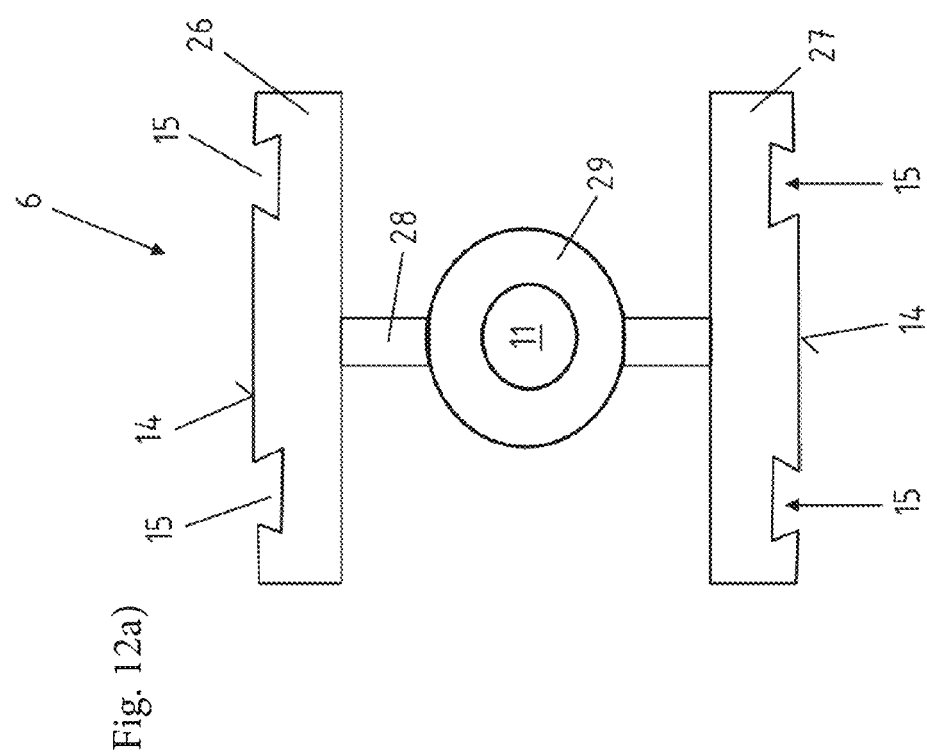

BUMPER ARRANGEMENT WITH A CLINCHED RECEPTACLE

RELATED APPLICATIONS

The present application claims priority of German Application Number 10 2019 108 907.7 filed Apr. 4, 2019, the disclosure of which is hereby incorporated by reference herein in its entirety.

FIELD

The present disclosure relates to a bumper arrangement on a motor vehicle.

BACKGROUND

It is known from the prior art to mount a respective bumper arrangement on the front side and on the rear side of a motor vehicle. Said bumper arrangement conventionally has a crossmember extending in the transverse direction of the motor vehicle, wherein the crossmember extends over a large part of the width of the motor vehicle itself. The crossmember is coupled to the motor vehicle. Said coupling takes place with the incorporation of crash boxes. The crash boxes extend in turn in the longitudinal direction of the motor vehicle and are deformed in the event of an impact, in order to convert the impact energy into deformation work. Further requirements imposed on the bumper arrangement consist in that the latter has to be produced cost-effectively and simply, is intended to have a low inherent weight and permits sufficient degrees of freedom for the exterior design of the motor vehicle itself. At the same time, the intention is to meet all of the crash requirements imposed by the manufacturer and the respective legislature.

If a motor vehicle is now being towed due to an accident or technical failure or if a motor vehicle is being lashed down for transport by sea or transport by air, it is furthermore known to screw towing eyes into the motor vehicle. From design aspects, said towing eyes, in passenger vehicles, are not directly visible or accessible for their function. Towing eyes are generally carried along in the boot compartment or elsewhere in a motor vehicle. If such a towing eye is now required, a flap in what is referred to as a front or rear skirt is removed. A mounting hole is located behind the flap. The towing eye is then inserted into said mounting hole. The mounting hole generally has an internal thread. The fastenings are mostly themselves provided on a bumper arrangement.

For example, EP 2 374 666 B1 is known, in which an extruded profile comprises a receptacle for such a towing eye and is inserted into a longitudinal member or a crash box. So that said extruded profile is coupled to the longitudinal member, it is provided to produce a hydroforming method or an integrally bonded connection by means of welding. However, both coupling methods are complicated and costly.

SUMMARY

It is therefore the object of the present disclosure to improve the bumper arrangement and the production methods thereof in relation to the prior art.

The bumper arrangement according to the disclosure is mounted on a motor vehicle. A motor vehicle with the bumper arrangement is therefore also part of this disclosure. For this purpose, the bumper arrangement has a crossmember and crash boxes, by means of which the crossmember is coupled to a motor vehicle. A receptacle for a towing eye is formed in the bumper arrangement itself. The receptacle itself is produced in the form of an extruded profile component and may also be called a receiving block.

According to the disclosure, it is provided that the receptacle is inserted into the crossmember and/or into a crash box and is fixed by clinching. This affords various advantages. Firstly, a protrusion caused by a welding seam is unnecessary, for example in the case of a receptacle which would be welded to a crossmember. Distortion caused by welding therefore does not occur either. Also, softening does not occur in the heat-affected zone since there is no thermal joining operation.

The clinching can take place simultaneously with perforating, embossing and/or calibrating, in a press tool step. Therefore, no separate handling is necessary, for example in a welding cell, and, as a result, no separate working step is necessary either.

Clinching is known in the production process as a joining method which is simple to produce. This is further simplified within the context of the disclosure by the fact that a groove is introduced in the receptacle and here in an outer lateral surface of the receptacle. The component to be joined to the receptacle, consequently a wall of the crash box or crossmember, can therefore be clinched or molded into the groove.

This in turn affords two advantages: firstly, a die is not required in order to partially deform the first joining partner into the second joining partner. The function of the die is therefore taken on by the groove.

A second advantage is that the groove, by means of previous production, can be formed relatively freely in its shaping. The groove is produced directly during the extrusion. It is therefore possible to configure the groove itself to be, for example, triangular in its cross section in such a manner that the width of the groove increases from the opening towards the groove base. A better form fit can thereby be provided since the joining partner which is deformed into the groove is therefore placed against the increasing cross-sectional contour. Within the context of this disclosure, a projection can also be formed from the groove base towards the groove opening. Therefore, if part of the wall of the respective joining partner is pressed into the groove, the projection promotes flowing of the wall into the increasing cross section of the groove. This is shown to some extent, for example, in FIGS. 10 and 11, in which a projection is formed in the direction of the groove opening and therefore an undercut is formed during the formation of the clinch connection.

Furthermore, different materials can be coupled to one another. A crash box produced itself from light metal can thus be coupled to the profile component, likewise extruded from light metal, of the receptacle. However, a crash box made of steel material can also be coupled to the profile component, extruded from light metal, of the receptacle. The receptacle itself is produced from an aluminum alloy. What has been previously stated also applies to the crossmember; consequently, the latter can likewise be produced from aluminum or steel.

The receptacle itself is designed in cross section as a closed hollow component, multi-chamber hollow component. An internal thread for receiving a towing eye is then formed in a chamber.

The receptacle has at least one groove in an outer lateral surface. A plurality of grooves are formed in the outer lateral surface of the receptacle. The respective joining partner, consequently the crash box or the crossmember and very specifically part of the wall, is then deformed into the groove or clinched to the groove.

Within the context of the disclosure, the clinching can be formed in a punctiform manner, but also in the manner of lengthwise portions, in the case of respective length portions of, for example, more than 5 mm, but not more than 100 mm. However, it would also be conceivable for the clinching to take place over the entire length of the groove.

Furthermore, the receptacle is inserted longitudinally into the crash box. The receptacle can also be inserted longitudinally into the cross member. This depends on whether the receptacle is arranged in the crossmember or in the crash box.

The groove now runs in the longitudinal direction with respect to the crash box or the crossmember. This permits the insertion operation. For example, the crash box or crossmember can be slightly embossed in advance in the region of the groove, and therefore there is already a guide for the insertion operation and, consequently, the embossing runs through the groove and, during the subsequent actual clinching operation, a mark where the punch is to be fitted for carrying out the clinching movement is then already provided.

Alternatively, it is also conceivable for the groove to run in a manner oriented in the transverse direction with respect to the longitudinal extent of the crash box or crossmember. This may be advantageous specifically from strength aspects. If a subsequent application of force or pulling direction runs in the longitudinal direction of the crash box or crossmember, a groove running in the transverse direction with respect thereto provides an improvement in respect of the force path.

The receptacle is arranged in a front end of a crash box. For a further increase in strength, an end side of the receptacle can lie at least in sections against a rear wall of the crossmember. The rear wall of the crossmember therefore effectively prevents the receptacle from being pulled out of the crash box in the event of a pulling actuation.

A further advantageous variant refinement provides a coupling of the crash box and crossmember by means of the receptacle. For this purpose, a receptacle is inserted into each crash box. The crossmember is sequentially coupled to the receptacle. For this purpose, a coupling piece is arranged on the crossmember itself or inserted into the crossmember. The coupling piece is then coupled to the receptacle in a manner reaching through and fixing the crossmember. This can take place in turn by means of a form fit.

A further alternative makes provision for the receptacle to be inserted into the crossmember itself and to lie against the rear side of the front wall of the crossmember and to be clinched to the front side. The receptacle is held in the crossmember by the clinching. A later pulling force during a towing operation is then optimally guided in respect of a force flux by the form-fitting lying in the receptacle against the rear wall of the crossmember.

The crossmember and/or the crash box itself can likewise be designed in cross section as a multi-chamber hollow profile, wherein separating webs in the interior separate the individual chambers from one another.

For the insertion of the receptacle, separating webs in the interior, which divide the individual chambers, are then at least partially removed. One or more separating webs are removed in a front region of the crash box such that the receptacle can be inserted into the crash box from the front.

BRIEF DESCRIPTION OF THE DRAWINGS

Further advantages, features, properties and aspects of the present disclosure are the subject matter of the description below. Various exemplary embodiments are illustrated in schematic figures. The latter serve for making the disclosure easier to understand. In the figures.

In the figures, the same reference signs are used for identical or similar components even if a repeated description is omitted for reasons of simplification.

DETAILED DESCRIPTION

Figure 1:
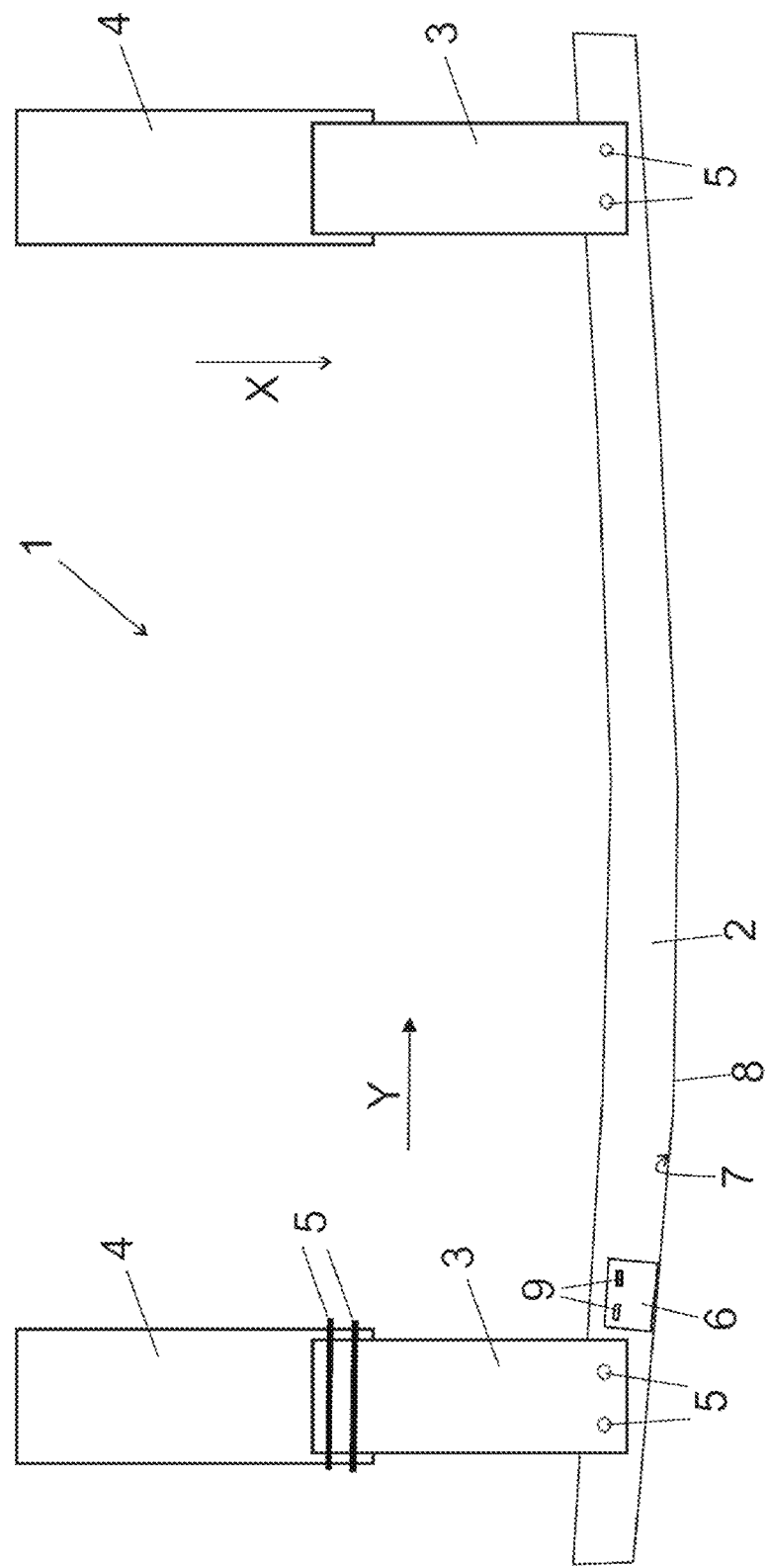
FIG. 1 shows a bumper arrangement according to the disclosure in top view according to at least one embodiment.

FIG. 1 shows a bumper arrangement 1 according to the disclosure in top view. The bumper arrangement 1 has a crossmember 2. The crossmember 2 is coupled via crash boxes 3, illustrated here, to longitudinal members 4 of a motor vehicle, not illustrated specifically. The crash box 3 is screwed to the longitudinal member 4 via screw bolts 5. Furthermore, the crash box 3 is screwed to the crossmember 2, likewise via screw bolts 5.

Alternatively, the crossmember 2 and crash box 3 can be connected to each other in an integrally bonded manner, by welding.

According to the disclosure, it is now provided that a receptacle 6 is arranged in the crossmember 2, which is illustrated schematically here. The receptacle 6 is arranged on a rear side 7 of the front wall 8 of the crossmember 2. Furthermore, two clinch connections 9 are formed, and therefore the receptacle 6 is held in the crossmember 2. The receptacle is offset laterally with respect to the transverse direction Y of the motor vehicle and is arranged adjacent to a crash box 3.

Figure 2:
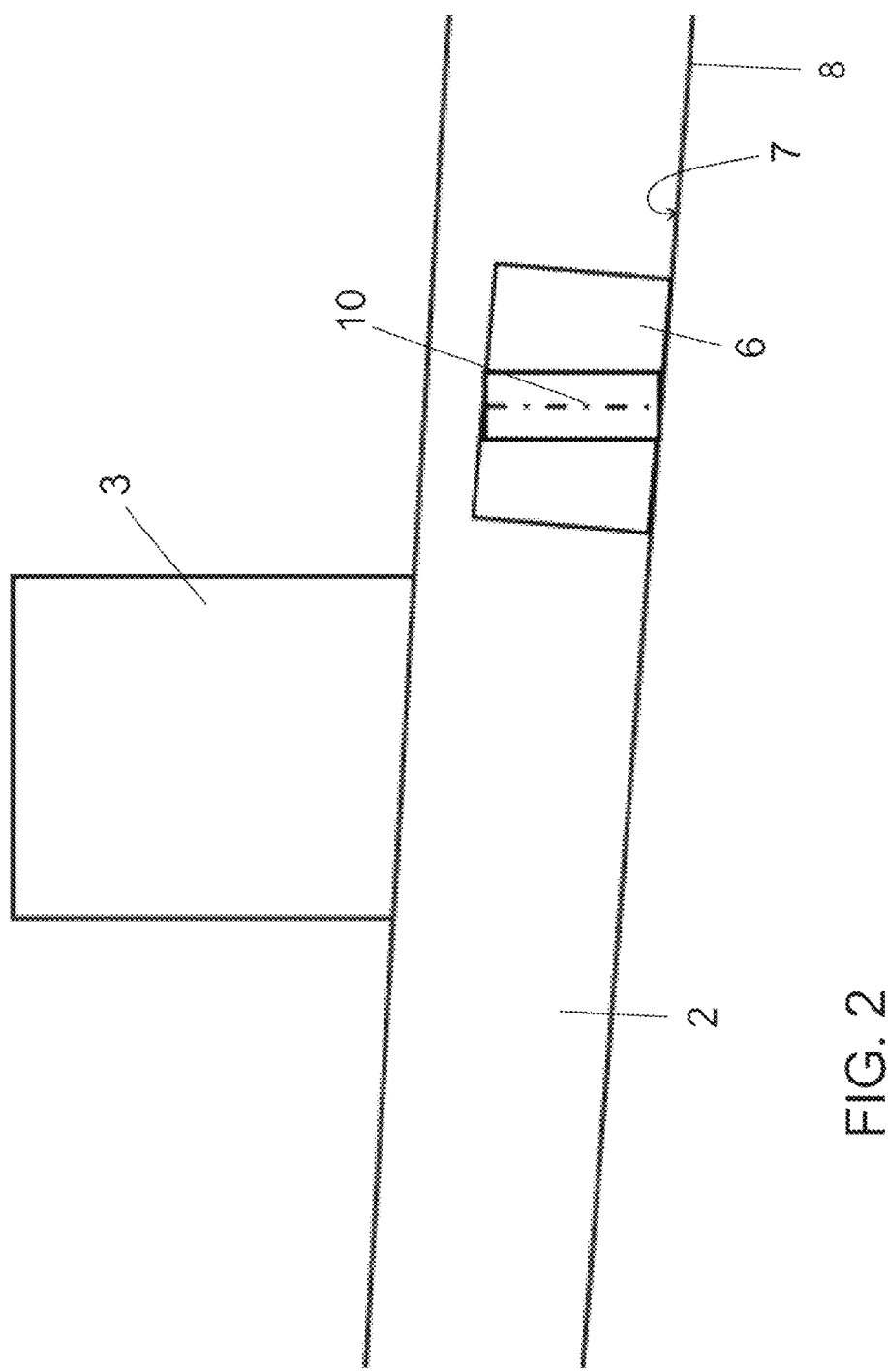
FIG. 2 shows an enlarged illustration of the top view of FIG. 1 according to at least one embodiment.
Figure 3:
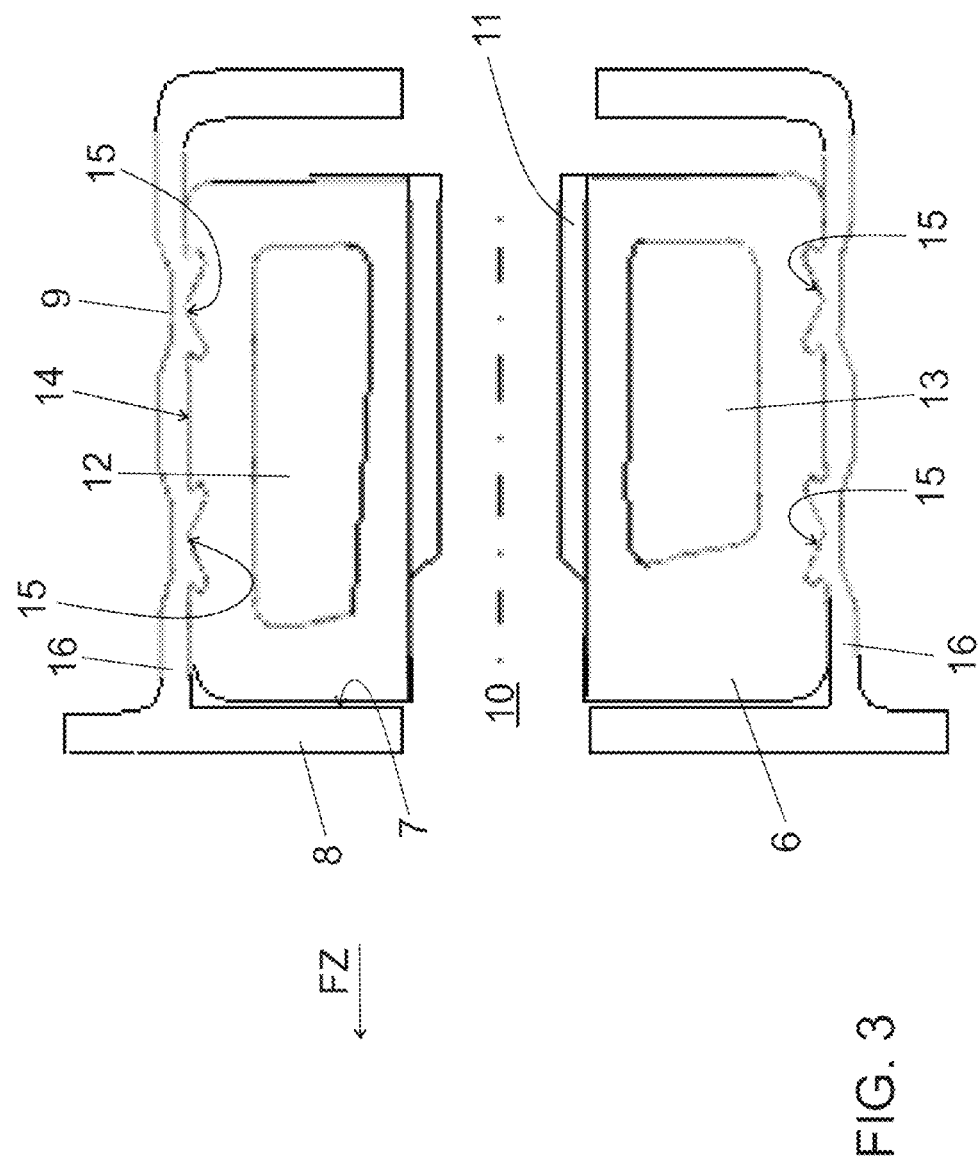
FIG. 3 shows a cross-sectional view of FIG. 1 according to at least one embodiment.

FIG. 2 shows an enlarged illustration of the top view and FIG. 3 a cross-sectional view of FIG. 1. It is illustrated here that an opening 10 is formed in the receptacle 6 and an internal thread 11 is arranged within the opening 10. The towing eye, not illustrated specifically, can therefore be screwed into the opening 10. The receptacle 6 itself is produced as a cross-sectionally extruded component. It has a plurality of chambers, wherein an upper hollow chamber 12 and a lower hollow chamber 13, illustrated here, are formed. The opening 10 is introduced by drilling following the extrusion. A groove 15 is formed in a respective outer lateral surface 14 of the receptacle 6. The groove 15 is produced directly during the extrusion operation. The respective wall 16 of the crossmember 2 is molded into the groove 15 in order to form the clinch connection 9. It can be seen here that the groove is enlarged in cross section towards the respective groove base. A secure clinch connection 9 with an undercut is thereby produced. The groove 15 extends in the longitudinal direction of the crossmember 2. The clinch connection 9 therefore runs transversely with respect to a pulling force FZ. The pulling force FZ occurs during the towing or lashing down of the motor vehicle when loading on a truck or ship or during a towing operation following a motor vehicle breakdown.

As illustrated in FIG. 3, the grooves can be triangular in cross section. Consequently, the cross section of the groove increases from a groove opening towards a groove base. A corresponding undercut is thereby formed during the clinching. This improves the strength of the clinch connection produced. Furthermore, a projection can be formed from the groove base towards the groove opening. The projection then makes it possible for the material which is pressed into the groove from the wall to correspondingly flow into the undercut.

Figure 4:
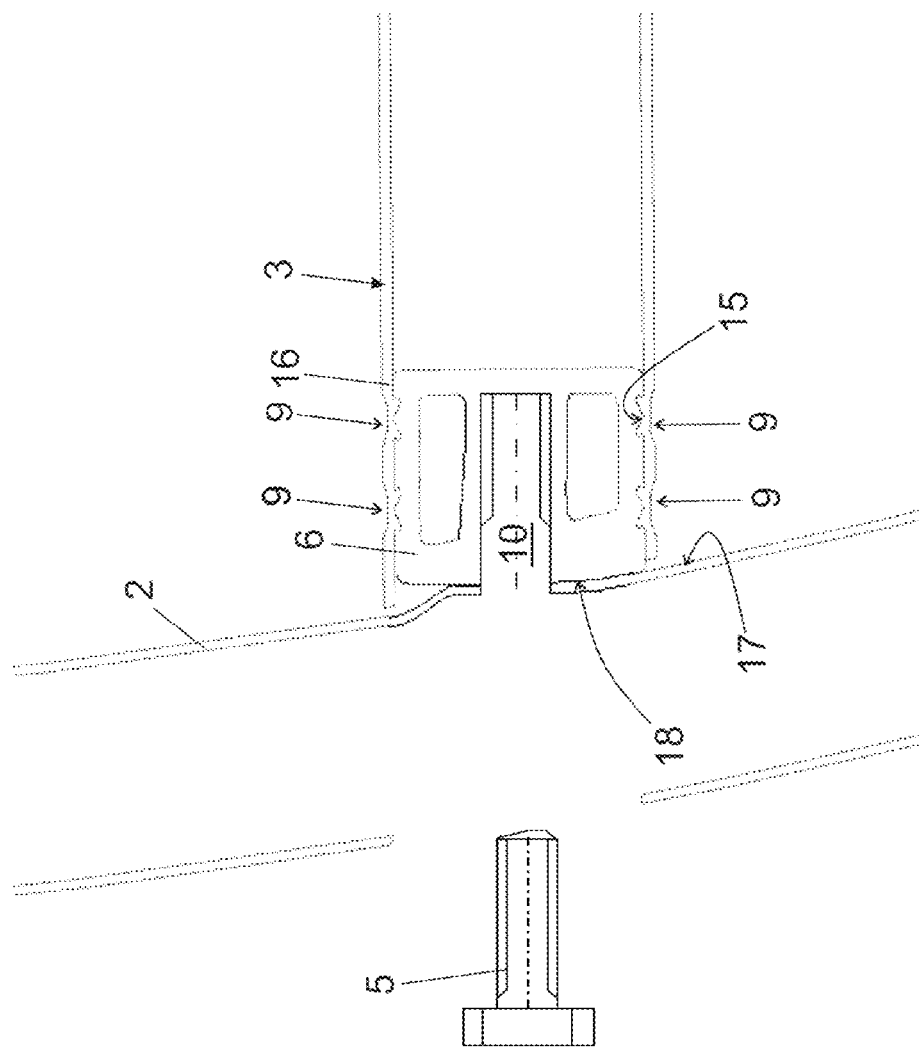
FIG. 4 shows an alternative variant according to at least one embodiment.

FIG. 4 shows an alternative variant refinement. In this case, the receptacle 6 is inserted into the crash box 3 from the front. Respective clinch connections 9 are produced in turn by embossing or pressing the wall 16 of the crash box 3 into the grooves 15 of the receptacle 6. The receptacle 6 lies against a rear wall 17 of the crossmember 2. The crossmember 2 is embossed on its rear wall 17 in the region of the receptacle 6 or has a contour adapted to the front end wall 18 of the receptacle 6 and thereby lies against the front end wall 18. The rear wall 17 can also be of flat design at least in sections in order to provide a corresponding contact surface with the end wall 18. A screw bolt 5 which is illustrated can then be inserted into the opening 10. At the same time, the crossmember 2 can thereby also be fixed to the crash box 3. Alternatively, a towing eye can be screwed into the opening 10, and the crash box 3 can be conventionally welded to the crossmember 2.

Figure 5:
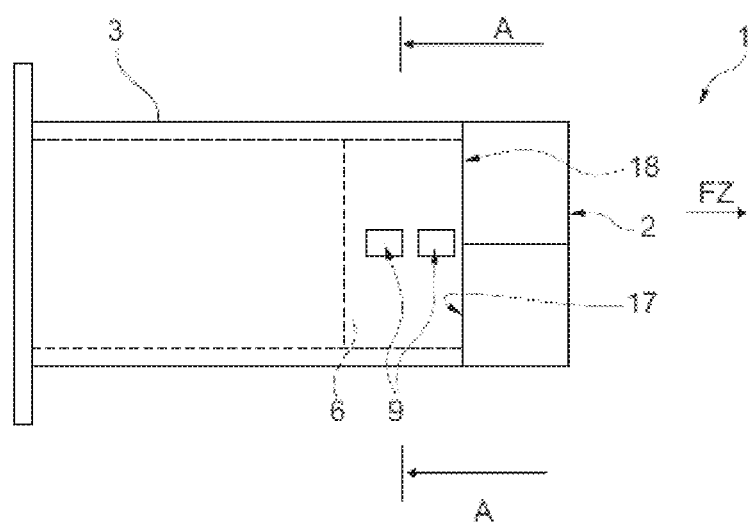
FIG. 5 shows a crash box in top view according to at least one embodiment.

FIG. 5 shows a further variant refinement of the present disclosure. A crash box 3 is shown here in a side view and, in FIG. 6, in a cross-sectional view according to the intersecting line A-A from FIG. 5. A receptacle 6 is arranged within the crash box 3, and a crossmember 2 is arranged in front of the crash box 3. The receptacle 6 is in turn coupled via two clinch connections 9 in each case to two opposite walls of the crash box 2. The receptacle 6 itself has a three-chamber hollow profile and is configured in the shape of a butterfly in the cross section itself. A central chamber with an opening 10 is arranged centrally, and therefore an internal thread, not illustrated specifically, is formed here for receiving a towing eye. According to the disclosure, a groove 15 is in turn formed in a respective outer lateral surface 14, in a manner produced directly during the extrusion process. The clinch connection 9 into the groove 15 is then formed. For this purpose, part of the wall 16 of the crash box 3 is deformed into the groove 15. The groove 15 itself is also configured in a triangular manner here in cross section and increases from a groove opening towards a groove base.

An end wall 18 of the receptacle 6 also lies here against a rear wall 17 of the crossmember 2. This avoids pulling out of the crash box 3 in the pulling direction FZ during a towing operation.

Figure 6:
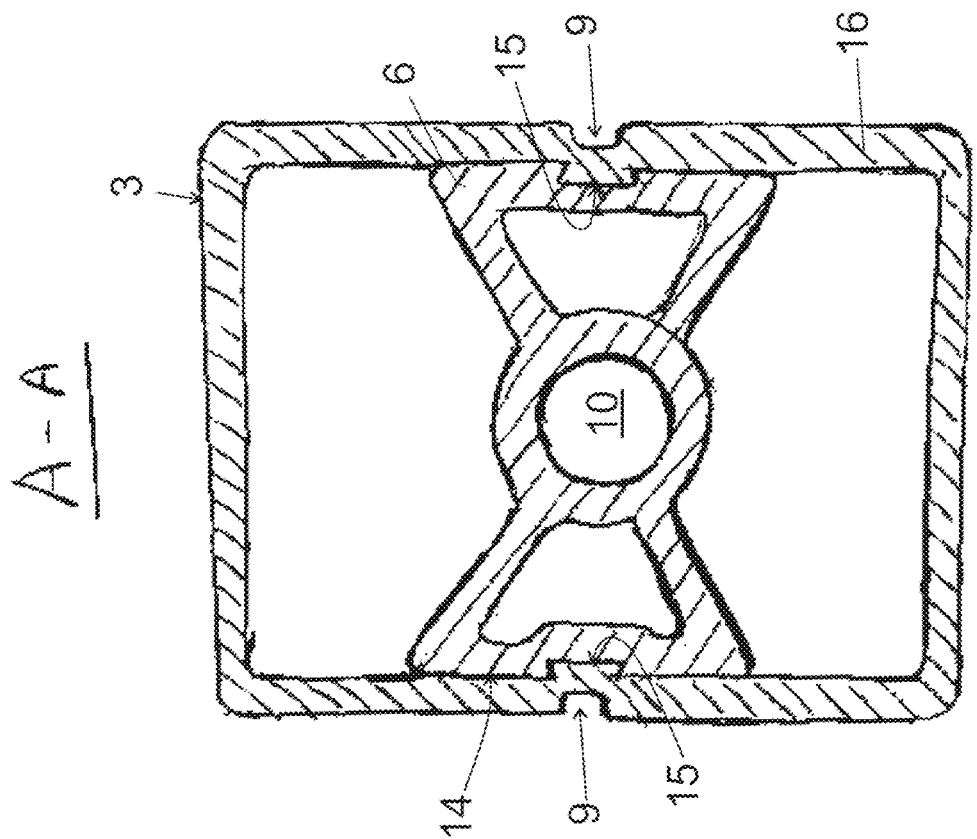
FIG. 6 shows a crash box in a cross-sectional view according to the intersecting line A-A according to at least one embodiment.
Figure 7:
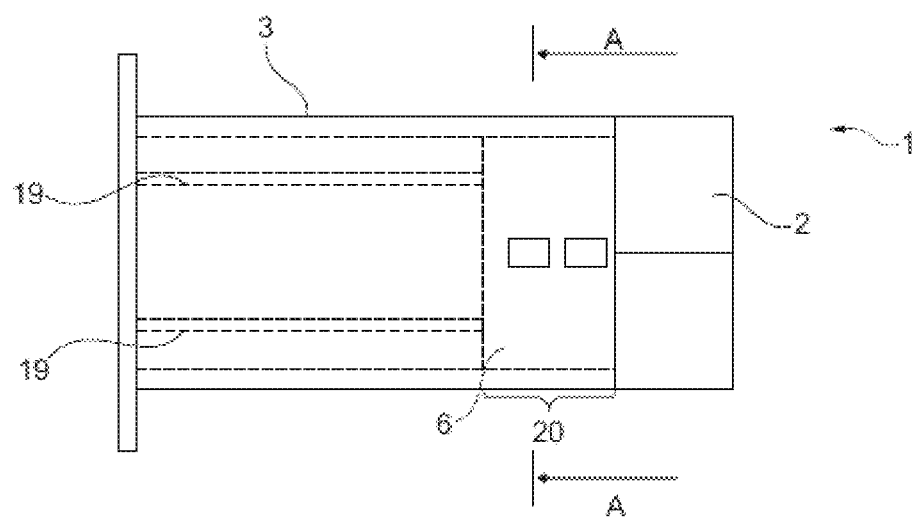
FIG. 7 shows an analogous variant of FIGS. 5 and 6 according to at least one embodiment.
Figure 8:
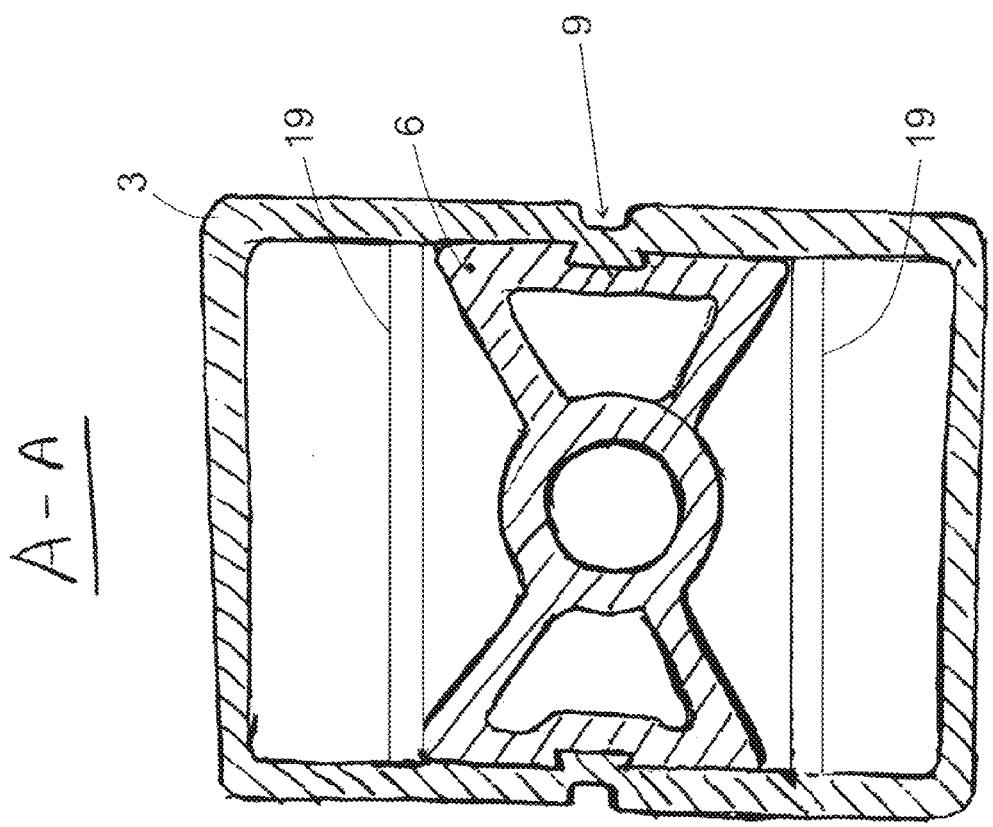
FIG. 8 shows an analogous variant of FIGS. 5 and 6 according to at least one embodiment.

FIGS. 7 and 8 show an analogous variant embodiment of FIGS. 5 and 6.

In this case, however, webs 19 or partitions are formed within the crash box 3. The partitions are removed in a front region 20 for the insertion of the receptacle 6.

Alternatively, the partitions are designed to be completely continuous and, with the walls of the crash box 2, surround the receptacle 6.

Figure 9:
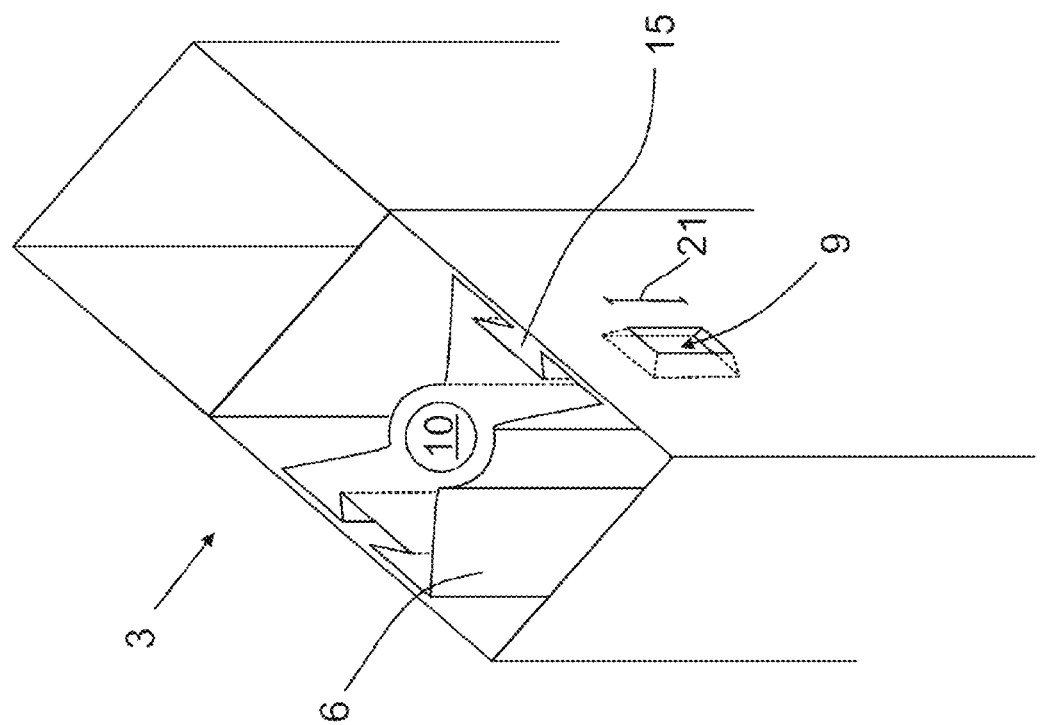
FIG. 9 shows a further variant according to at least one embodiment.

FIG. 9 shows a further variant refinement according to the disclosure. The crash box 3 is designed here in cross section as a two-chamber hollow profile. The receptacle 6 is formed here in a chamber. The grooves 15 run in a manner oriented in the longitudinal direction of the crash box 3. Length portionwise, the wall 16 of the crash box 3 is then deformed into the groove 15 in order to form the clinch connection 9. A central opening 10 can then be screwed into a towing eye, not illustrated specifically.

In general, the receptacle 6 is pushed into a respective hollow chamber of the crossmember 2 or crash box 3. The receptacle 6 can then be fixed in advance, for example by means of embossing or else by means of adhesive bonding. The receptacle 6 is then finally fixed by the clinching operation itself.

It is also possible for an edge or tab, not illustrated specifically, to be formed in the crossmember 2 or crash box 3 and for said edge or tab to be bent over in order to correspondingly fix the receptacle 6 in advance.

Figure 10:
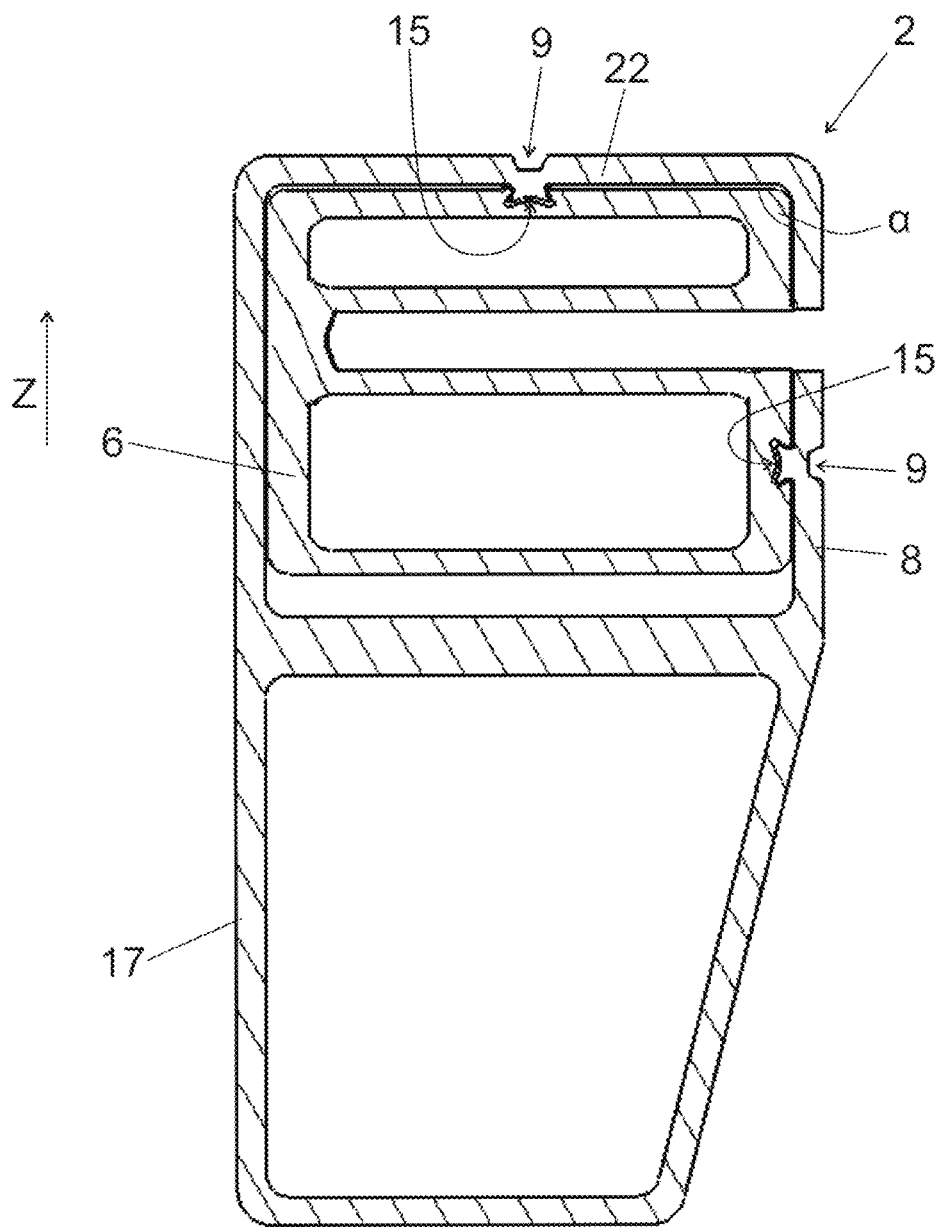
FIG. 10 shows a cross-sectional view of a crossmember with an inserted receptacle according to at least one embodiment.

FIG. 10 shows a cross-sectional view of a crossmember 2 with an inserted receptacle. The crossmember 2 itself is designed as a two-chamber hollow profile. The receptacle 6 is inserted into the upper chamber, with respect to the vertical direction Z of the motor vehicle. The receptacle is clinched to an upper wall 22 and to the front wall 8 of the crossmember. For this purpose the walls, in this case the upper wall 22 and the front wall 8, are arranged at an angle, at a 90 degree angle α, with respect to each other.

It would also be conceivable within the context of the disclosure for the receptacle 6 to be inserted into the lower chamber with respect to the vertical direction Z of the motor vehicle. If clinching were then to take place to the front wall 8 and the illustrated lower wall 23, said walls would then be arranged at an angle α of approx. 70 or 80 degrees with respect to each other.

A clinch connection 9 could optionally also be formed to the rear wall 12.

Figure 11:
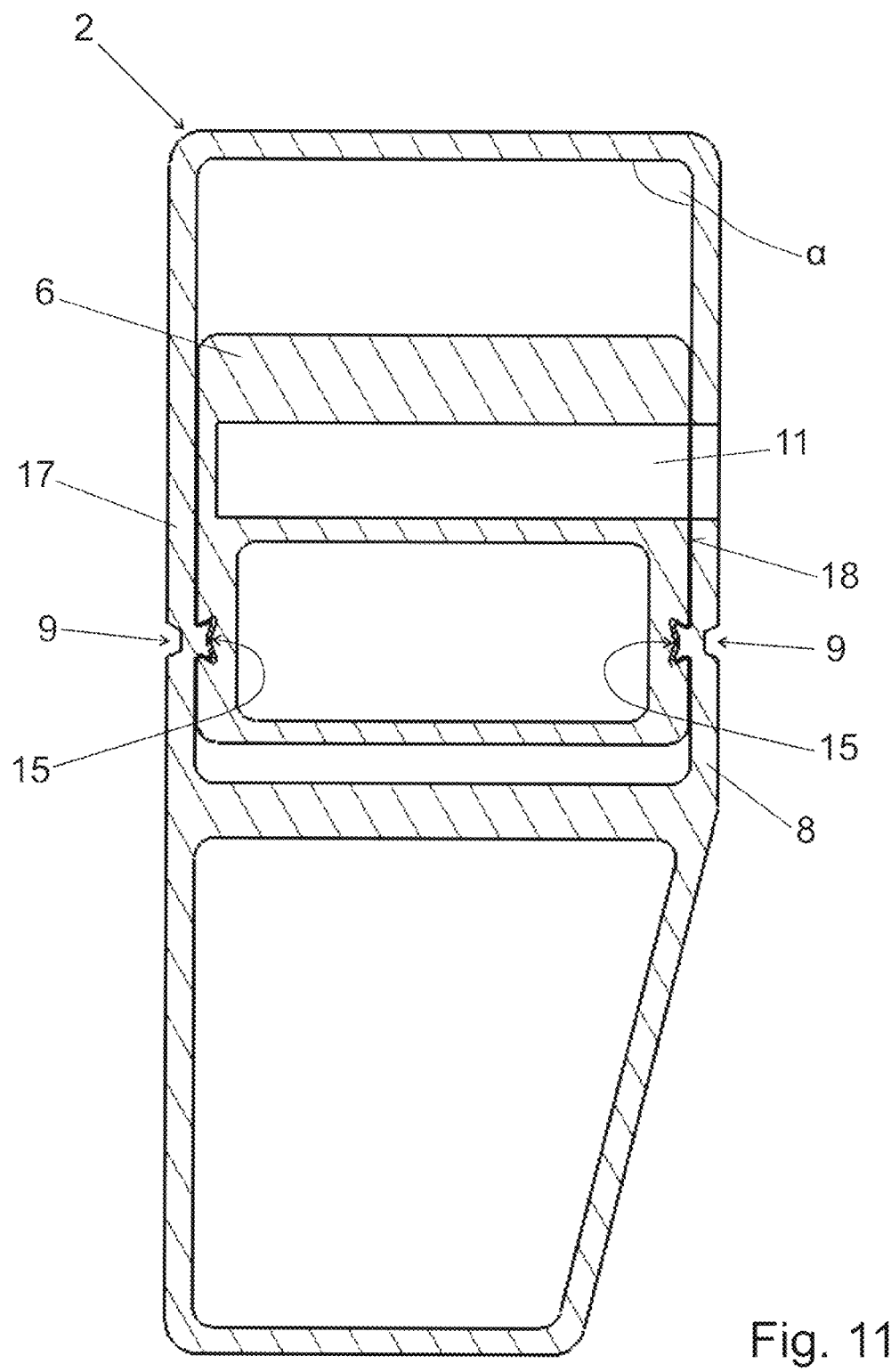
FIG. 11 shows a cross-sectional view of an alternative to FIG. 10 according to at least one embodiment, and FIGS. 12*a* and *b* show an end view and a perspective view of a variant of a receptacle in the form of an extruded component according to at least one embodiment.

FIG. 11 shows a crossmember 2 according to the disclosure in an alternative variant refinement. The receptacle 6 here is in turn arranged in a crossmember 2. The crossmember 2 itself is designed as a two-chamber hollow profile. The receptacle 6 is also arranged here in turn in the upper chamber, with respect to the vertical direction Z. The receptacle 6 is clinched to the front wall 8 and to the rear wall 17, consequently on two opposite sides, wherein a groove is in each case formed here in the receptacle 6 in order to form the clinch connection 9. It would also be conceivable for further grooves to be formed in the receptacle 6. The receptacle 6 can likewise also be arranged in the lower chamber, as already described with regard to FIG. 10.

FIGS. 12*a* and 12*b* show an end view and a perspective view of a receptacle 6 according to the disclosure. The latter is produced in the form of an extruded component. It corresponds in cross section to the shape of an I support. An upper transverse web 26 and a lower transverse web 27 are connected by a web 28. A cylindrical receptacle 29 in which the internal thread 11 for the screwing in of a towing eye, not illustrated specifically, is located is integrated in the web 28. The receptacle 6 can then be correspondingly inserted into a crash box, not illustrated specifically, and the respective grooves can be clinched.

The foregoing description of some embodiments of the disclosure has been presented for purposes of illustration and description. It is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. It should be understood that various changes, substitutions and alterations can be made hereto without departing from the spirit and scope of the disclosure.

The invention claimed is:

1. A bumper arrangement of a motor vehicle, the bumper arrangement comprising:
   a crossmember;
   crash boxes, wherein the crossmember is coupled to the crash boxes;
   a receptacle for a towing eye, wherein the receptacle has an extruded profile component,
   the receptacle is inserted into the crossmember or into a crash box, and
   the receptacle has at least one groove in an outer lateral surface for affixing to the crossmember or to the crash box.

2. The bumper arrangement according to claim 1, wherein the receptacle comprises a cross-sectionally closed hollow component having an internal thread for receiving the towing eye.

3. The bumper arrangement according to claim 1, wherein the receptacle has a plurality of grooves in the outer lateral surface, wherein each of two opposite walls of the receptacle have at least two grooves of the plurality of grooves.

4. The bumper arrangement according to claim 3, wherein the at least two grooves differ from each other, the two opposite walls are arranged at an angle with respect to each other, and the angle is from 80 to 100 degrees.

5. The bumper arrangement according to claim 1, wherein the at least one groove runs in a manner oriented in a longitudinal direction with respect to the crash box or the crossmember.

6. The bumper arrangement according to claim 1, wherein the receptacle is arranged in a front end of the crash box, and an end wall of the receptacle contacts a rear wall of the crossmember.

7. The bumper arrangement according to claim 1, further comprising a coupling piece in the crossmember, wherein the receptacle is in the crash box, and the coupling piece is coupled to the receptacle in a manner at least partially reaching through and fixing the crossmember.

8. The bumper arrangement according to claim 1, wherein the receptacle is inserted into the crossmember, and the receptacle contacts a rear side of a front wall of the crossmember.

9. The bumper arrangement according to claim 1, wherein the crash box comprises a multi-chamber hollow profile cross section, a region of the crash box is free of an inner separating webs.

10. The bumper arrangement according to claim 4, wherein the crossmember has at least two-chamber hollow profiles, the hollow chambers are arranged one above the other with respect to a vertical direction of the motor vehicle and the receptacle is inserted into a hollow chamber, and a front wall of the crossmember is clinched to a groove and an upper wall in the case of the upper hollow chamber.

11. The bumper arrangement according to claim 1, wherein the receptacle is adjacent to a crash box of the crash boxes with respect to a longitudinal direction of the crossmember.

12. The bumper arrangement according to claim 1, wherein the receptacle is a multi-chamber hollow component, and the receptacle comprises an internal thread for receiving the towing eye.

13. The bumper arrangement according to claim 1, wherein the receptacle has a plurality of grooves in an outer lateral surface, and at least two grooves in two adjacent walls of the receptacle are at an angle with respect to each other.

14. The bumper arrangement according to claim 3, wherein the at least two grooves in the opposite walls of the receptacle differ from each other, and the two opposite walls are arranged at an angle with respect to each other, and the angle is 90 degrees.

15. The bumper arrangement according to claim 1, wherein the at least one groove of the receptacle runs in a manner oriented in a transverse direction with respect to the crash box or the crossmember.

16. The bumper arrangement according to claim 1, wherein the at least one groove runs at an angle with respect to the longitudinal direction of the crossmember.

17. The bumper arrangement according to claim 1, wherein the receptacle is offset inwards adjacent to the crash box with respect to a transverse direction of the motor vehicle.

18. The bumper arrangement according to claim 4, wherein the crossmember has at least two-chamber hollow profiles, the hollow chambers are arranged one above the other with respect to a vertical direction of the motor vehicle and the receptacle is inserted into a hollow chamber, and a front wall of the crossmember is clinched to a groove and a lower wall in the case of the lower hollow chamber is clinched to a second groove.

* * * * *